(12) United States Patent
Liang et al.

(10) Patent No.: US 11,217,822 B2
(45) Date of Patent: Jan. 4, 2022

(54) SOLID ELECTROLYTE SHEET AND PREPARATION METHOD THEREOF, BATTERY AND DEVICE INCLUDING THE SAME

(71) Applicant: Contemporary Amperex Technology Co., Limited, Ningde (CN)

(72) Inventors: Chengdu Liang, Ningde (CN); Chengyong Liu, Ningde (CN); Bobing Hu, Ningde (CN); Jiawei Fu, Ningde (CN); Qian Li, Ningde (CN); Meng Cheng, Ningde (CN); Yongsheng Guo, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 16/972,824

(22) PCT Filed: Jun. 17, 2020

(86) PCT No.: PCT/CN2020/096444
§ 371 (c)(1),
(2) Date: Dec. 7, 2020

(87) PCT Pub. No.: WO2021/008289
PCT Pub. Date: Jan. 21, 2021

(65) Prior Publication Data
US 2021/0257657 A1    Aug. 19, 2021

(30) Foreign Application Priority Data

Jul. 16, 2019  (CN) .......................... 201910642035.8

(51) Int. Cl.
*H01M 10/0562* (2010.01)
*H01M 10/0525* (2010.01)
*H01M 10/0585* (2010.01)

(52) U.S. Cl.
CPC ... *H01M 10/0562* (2013.01); *H01M 10/0525* (2013.01); *H01M 10/0585* (2013.01); *H01M 2300/0068* (2013.01)

(58) Field of Classification Search
CPC ......... H01M 10/0562; H01M 10/0585; H01M 10/0525; H01M 2300/0068;
(Continued)

(56) References Cited

U.S. PATENT DOCUMENTS

2016/0293947 A1*  10/2016  Tamura ................... H01M 4/36
2020/0052330 A1*  2/2020   Choi ..................... H01M 4/525

FOREIGN PATENT DOCUMENTS

| CN | 102884667 A | 1/2013 |
|---|---|---|
| CN | 105098228 A | 11/2015 |

(Continued)

OTHER PUBLICATIONS

Search Report dated Sep. 8, 2020 in corresponding International Application No. PCT/CN2020/096444; 4 pages.
(Continued)

*Primary Examiner* — Gary D Harris
(74) *Attorney, Agent, or Firm* — Maier & Maier, PLLC (57) ABSTRACT

The present application provides a preparation method for a solid electrolyte, including: acquiring an initial reaction mixture including a lithium precursor, a central atom ligand and an organic solvent; acquiring a modified solution including a borate ester and the organic solvent; mixing the initial reaction mixture and the modified solution, and drying to acquire an initial product; performing a grinding, cold press and heat treatment to the initial product to obtain the solid electrolyte. In the preparation method provided by the present application, a B and O co-doped sulphide solid electrolyte can be obtained by modifying the sulphide solid electrolyte with the borate ester as a doping raw material.

(Continued)

The ionic conductivity of the prepared sulphide solid electrolyte is significantly improved, which is also conducive to improvement of energy density of the all-solid-state batteries.

19 Claims, 3 Drawing Sheets

(58) Field of Classification Search
CPC .............. H01M 10/052; C01P 2002/72; C01P 2002/82; C01P 2006/40; Y02E 60/10; C01B 17/22
USPC .......................................................... 429/162
See application file for complete search history.

(56) References Cited

FOREIGN PATENT DOCUMENTS

| | | |
|---|---|---|
| CN | 107258031 A | 10/2017 |
| CN | 107666010 A | 2/2018 |
| JP | 2007-273214 A | 10/2007 |

OTHER PUBLICATIONS

Written Opinion dated Sep. 8, 2020 in corresponding International Application No. PCT/CN2020/096444; 9 pages.
Marcela Calpa et al., "Preparation of sulfide solid electrolytes in the Li2S-P2S5 system by a liquid phase process", Inorganic Chemistry Frontiers, Dec. 25, 2017, 35 pages.
Chinese Office dated Jul. 7, 2021, in connection with corresponding CN Application No. 201910642035.8 (10 pp., including machine-generated English translation).
Extended European Search Report dated Oct. 15, 2021, in connection with corresponding European Application Mo 20812213.5; 9 pp.
Chakrabarti et al., "Borate ester plasticizer for PEO-based solid polymer electrolytes," Journal of Solid State Electrochemistry, 12, 2008, 4 pages (pp. 269-272).

* cited by examiner

SOLID ELECTROLYTE SHEET AND PREPARATION METHOD THEREOF, BATTERY AND DEVICE INCLUDING THE SAME

CROSS-REFERENCE TO RELATED APPLICATIONS

This application is a National Stage of International Application No. PCT/CN2020/096444, filed on 17 Jun. 2020, which claims the priority of Chinese Patent Application No. 201910642035.8, filed on Jul. 16, 2019, entitled "PREPARATION METHOD FOR SOLID ELECTROLYTE", both of which are incorporated herein by reference in their entireties.

TECHNICAL FIELD

The present application relates to the technical field of battery, and in particularly to a solid electrolyte and the preparation method thereof, and also to a battery and device including the sulphide solid electrolyte sheet.

BACKGROUND

In recent years, with the rapid development of consumer electronic device and the electric vehicle industry, lithium ion batteries have become the most widely used secondary battery technology in social life. However, with the rapid growth in the number of lithium battery products, negative news of the smoke, fire and even explosion of lithium batteries is heard without end. The safety and energy density of lithium ion batteries need to be improved.

Traditional liquid lithium batteries are difficult to avoid battery safety accidents due to the volatile and flammable characteristics of the liquid electrolyte. Therefore, solid electrolyte as an alternative to electrolyte with a higher safety performance has attracted attention. Depending on the material system, the existing solid electrolyte may be divided into three categories: sulphide solid electrolyte, oxide solid electrolyte and polymer solid electrolyte. Where the sulphide solid electrolyte is also one of the most promising solid electrolyte systems due to its ionic conductivity comparable to that of liquid electrolyte at room temperature and its processing characteristics of easier molding and densification. However, the existing sulphide solid electrolytes still have problems of low ionic conductivity, and the energy density and cycle performance of sulphide solid-state batteries need to be improved.

SUMMARY

In view of the existing problems in the prior art, the purpose of the present application is to provide a preparation method for a solid electrolyte to improve the conductivity of the solid electrolyte.

To achieve the above purpose, a first aspect of the present application provides a preparation method for a solid electrolyte, comprising:

acquiring an initial reaction mixture comprising a lithium precursor, a central atom ligand and an organic solvent;

acquiring a modified solution including a borate ester and the organic solvent;

mixing the initial reaction mixture and the modified solution, and drying to obtain an initial product;

performing a post-treatment to the initial product to obtain the solid electrolyte.

A second aspect of the present application provides a solid electrolyte prepared by the above method.

A third aspect of the present application provides a solid electrolyte sheet, the solid electrolyte sheet is prepared by the solid electrolyte prepared by the preparation method in the first aspect of the present application or prepared by the solid electrolyte in the second aspect of the present application.

A fourth aspect of the present application provides an all-solid-state lithium ion battery, the all-solid-state lithium ion battery is prepared by the solid electrolyte prepared by the preparation method in the first aspect of the present application or prepared by the solid electrolyte in the second aspect of the present application, or prepared by the solid electrolyte sheet in the third aspect of the present application.

A fifth aspect of the present application provides a stacked all-solid-state lithium ion battery, including:

a positive electrode sheet, a solid electrolyte sheet and an negative electrode sheet; where the solid electrolyte sheet is the solid electrolyte sheet in the third aspect of the present application.

A sixth aspect of the present application provides a device, including:

the all-solid-state lithium ion battery in the fourth aspect of the present application or the stacked all-solid-state lithium ion battery in the fifth aspect of the present application.

Compared with the prior art, the application includes at least the following beneficial effects:

In an embodiment of the present application, modifying the sulphide solid electrolyte by using borate ester as the doping raw material, a doping of element B may reduce the constraining effect of anion on lithium ion to improve a transmission ability of lithium ion; a partly doping of element O instead of element S can not only produce mixed anion effect so as to improve lithium ion conductivity, but also inhibit the formation of space charge layer at the interface between oxide cathode and sulphide electrolyte to reduce interface impedance; where the borate ester introduced in during the doping process, as a Lewis acid, has a 2P empty orbital to form complexes with the electron donors of the sulphide electrolyte material, promote the sufficient reaction of the sulphide electrolyte material and the doping material, and improve the doping uniformity and conductivity of the reaction product.

The inventor believes that in the doping and modification process of the solid electrolyte, if the raw material of the sulphide electrolyte is directly mixed with the inorganic compound with a cation or anion to be doped (e.g., boron sulphide) and being heat treated, it is difficult to achieve uniform dispersion in this mixing method due to the problem of solid-solid contact between inorganic particles, and it is also prone to lead to the formation of a impurity phase during the mixing and heat treatment of the raw material. However, the present application makes use of the property that the borate ester forms a uniformly dispersed solution in the solvent, and achieves sufficient mixing between the electrolyte raw material and the borate ester to be doped. Moreover, the borate ester can be completely decomposed at the phase formation temperature of the sulphide electrolyte, thereby reducing the introduction of impurities or residual reactants, and significantly improving the ionic conductivity of the prepared sulfide solid electrolyte, thus contributing to the development of energy density of the all-solid-state batteries.

DETAILED DESCRIPTION OF THE EMBODIMENTS

A preparation method for a solid electrolyte provided by an embodiment of the present application includes:

acquiring an initial reaction mixture including a lithium precursor, a central atom ligand and an organic solvent;

acquiring a modified solution including a borate ester and the organic solvent;

mixing the initial reaction mixture and the modified solution, and drying to obtain an initial product;

performing a post-treatment to the initial product to obtain the solid electrolyte.

According to an embodiment of the present application, a B and O co-doped solid electrolyte may be obtained, where, the doping of element B may reduce the constraining effect of anion on lithium ion to improve a transmission ability of lithium ion; a partly doping of element O instead of element S can not only produce mixed anion effect so as to improve lithium ion conductivity, but also to inhibit the formation of space charge layer at the interface between oxide cathode and sulphide electrolyte to reduce interface impedance; where the borate ester introduced in during the doping process, as a Lewis acid, has a 2P empty orbital to form complexes with the electron donors of the lithium precursor (such as $Li_2S$), promote the sufficient reaction of the sulphide electrolyte material and the doping material, and improve the purity and conductivity of the reaction product. The present application makes use of the property that the borate ester forms a uniformly dispersed solution in the suitable solvent, and achieves sufficient mixing between the electrolyte raw material and the borate ester to be doped in the doping and modification process. Furthermore, a DSC-TG test shows that the borate ester has an endothermic decomposition peak and a weight loss curve in the range below the phase formation temperature of sulphide, which means that the borate ester can be completely decomposed at the phase formation temperature of the sulfide electrolyte, thereby reducing the introduction of impurities or reactant residues and significantly improving the ionic conductivity of the final prepared sulfide electrolyte.

According to a preferred embodiment of the present application, the lithium precursor includes one or more of $Li_2S$ and LiX.

According to a preferred embodiment of the present application, X includes one or more of F, Cl, Br and I, preferably Cl.

According to a preferred embodiment of the present application, the central atom ligand includes one or more of $P_2S_5$, $SiS_2$, $GeS_2$, $B_2S_3$ and $Al_2S_3$.

According to a preferred embodiment of the present application, the borate ester has a structure shown in formula (I):

where, R is selected from C1~C4 alkyl.

The number of carbon atom in borate ester may affect a solubility of the borate ester in organic solvent. Generally, with the increase of the number of carbon atom, the solubility may decrease to a certain extent. However, although the solubility of the borate ester decrease, the solid electrolyte obtained by the preparation method employed in the present application still maintains a greater advantage in the conductivity performance compared with the solid-solid contact preparation method. Of course, a reasonable control of the number of carbon atoms of the borate ester is necessary to obtain a solid electrolyte with even better performance.

According to a preferred embodiment of the present application, the borate ester is selected from one or more of structures (I-1) to (I-4):

According to a preferred embodiment of the present application, an amount of substance of the lithium precursor accounts for 70~94% of a total amount of substance of the lithium precursor, central atom ligand and borate ester.

According to a preferred embodiment of the present application, an amount of substance of the central atom ligand accounts for 5% to 25% of the total amount of substance of the lithium precursor, central atom ligand and borate ester.

According to a preferred embodiment of the present application, an amount of substance of the borate ester accounts for 0.1% to 5% of the total amount of substance of the lithium precursor, central atom ligand and borate ester.

A content of borate ester may affect the electrochemical performance of the solid electrolyte, and the borate ester is added mainly to synthesize B and O co-doped solid electrolyte and increase the ionic conductivity of lithium ion in solid electrolyte. When the borate ester content is too low, the content of B in the formed B and O co-doped solid electrolyte is low, which can increase the lithium ion conductivity of the solid electrolyte to a certain extent, but the effect is limited, so the content of borate ester needs to be controlled to account for 0.5% to 2% of total amount of substance. If the borate ester content is too high, the relative content of lithium precursor will be reduced, resulting in low lithium ion concentration in solid electrolyte, and the excessive introduction of B and O elements may cause changes in the structure of solid electrolyte, which is not conducive to the electrochemical performance of the solid electrolyte.

According to a preferred embodiment of the present application, the amount of substance of the lithium precursor accounts for 83% to 90% of a total amount of substance of the lithium precursor, central atom ligand and borate ester.

According to a preferred embodiment of the present application, the amount of substance of the central atom ligand accounts for 8% to 15% of the total amount of substance of the lithium precursor, central atom ligand and borate ester.

According to a preferred embodiment of the present application, the amount of substance of the borate ester accounts for 0.5% to 2% of the total amount of substance of the lithium precursor, central atom ligand and borate ester.

According to a preferred embodiment of the present application, dispersing the lithium precursor and central atom ligand into the organic solvent to form the initial reaction mixture.

According to a preferred embodiment of the present application, dispersing the borate ester into the organic solvent to form the modified solution.

According to a preferred embodiment of the present application, after mixing the initial reaction mixture and the modified solution, a sufficient dispersing is performed, a time for the sufficient dispersing is 5~20 hours.

According to a preferred embodiment of the present application, the time of the sufficient dispersing is 10~15 hours A dispersion time of borate ester affects the mixing effect between the initial reaction mixture and modified solution. When the dispersion time is too short, although the electrical conductivity of the solid electrolyte is improved to a certain extent, the conductivity of the prepared solid electrolyte and the battery performance will not be improved significantly because the borate ester and the reaction materials (lithium precursor and central atomic ligand) cannot be fully contacted; when the dispersion time is too long, although the conductivity of the prepared solid electrolyte can be improved, the production efficiency will be reduced at the same time.

According to a preferred embodiment of the present application, the post-treatment includes performing grinding, cold press and heat treatment to the initial product to obtain the solid electrolyte.

According to a preferred embodiment of the present application, the cold press is a cold press molding under a cold press pressure of 50 to 200 MPa.

According to a preferred embodiment of the present application, the cold press is the cold press molding under the cold press pressure of 80 to 120 MPa.

The cold press pressure of the initial product may affect the performance of the prepared solid electrolyte and battery. Specifically, the cold press pressure of the initial product may affect the diffusion process between elements during the high temperature heat treatment process. When the pressure is too small, the looseness of the block causes poor contact between the reaction materials, which affects the formation of the phase structure and the increase of conductivity, although it is improved compared to the conductivity in the comparative example, the magnitude of the improvement is not large; and when the pressure is too high, the block is prone to severe cracking and is not conducive to product formation, although the conductivity has been increased, but it is not enough to make a significant difference.

According to a preferred embodiment of the present application, a temperature range of the heat treatment is between 400 and 700° C.

According to a preferred embodiment of the present application, the temperature range of the heat treatment is between 500 and 600° C.

The heat treatment temperature may affect the performance of the prepared solid electrolyte and battery. Specifically, the heat treatment temperature should match the phase formation temperature of sulphide and the decomposition temperature of borate ester. When the heat treatment temperature is too low, the specific electrolyte crystal phase cannot be obtained and the boric acid ester cannot be completely decomposed, so the electrolyte conductivity is increased, but the increase in conductivity is small due to the extremely low amount of effective B doping; if the heat treatment temperature is too high, the sulphide electrolyte itself is prone to undergo phase change, resulting in the formation of a impurity phase, the increase of conductivity and the delivery of capacity may also be reduced.

According to a preferred embodiment of the present application, a time for the heat treatment the heat treatment is 0.5 to 5 hours.

According to a preferred embodiment of the present application, the time for the heat treatment is 1 to 2 hours.

The time for heat treatment has a great influence on the formation of the phase structure of the electrolyte and the internal diffusion process of the doping elements. When the time is too short, there may be residual reactants and uneven distribution of the doping elements, making it difficult to improve the electrolyte conductivity and battery capacity to the best; when the time for the heat treatment is too long, it may cause the generation of the impurity phase and also affect the battery performance to the best.

According to a preferred embodiment of the present application, the organic solvent used to disperse the lithium precursor, central atom ligand and the organic solvent used to disperse the borate ester may be independently selected from one or more of tetrahydrofuran, acetonitrile, pyridine, methanol, ethanol, propanol, isopropanol, butanol, propyl propionate, butyl propionate, and butyl butyrate.

According to a preferred embodiment of the present application, while dispersing the lithium precursor and central atom ligand into the organic solvent, and dispersing the borate ester into the organic solvent, lithium precursor, the volume ratio of the total volume of lithium precursor and the central atom ligand, and the volume ratio of the organic solvent can be 1:1 to 1:10, and the volume ratio of the borate ester and the organic solvent can be 1:1 to 1:10.

According to a preferred embodiment of the present application, while mixing the initial reaction mixture with modified solution, the co-mixing method used may be a ball milling method.

According to a preferred embodiment of the present application, the drying process needs to be performed under a vacuum environment with a vacuum degree of less than −90 kPa, and the drying temperature is 100 to 120° C.

According to a preferred embodiment of the present application, an atmosphere for the heat treatment may be an inert atmospheres such as argon and nitrogen.

An embodiment of the present application also provides a solid electrolyte prepared by the preparation method of the embodiment of the present application.

According to a preferred embodiment of the present application, a conductivity of the solid electrolyte is above 1.4 mS/cm, preferably 1.4 to 2.1 mS/cm.

According to a preferred embodiment of the present application, a battery capacity of the solid electrolyte is above 140 mAh/g, preferably 142 to 160 mAh/g.

An embodiment of the present application also provides a solid electrolyte sheet, the solid electrolyte sheet is prepared by the solid electrolyte of the present application.

According to a preferred embodiment of the present application, the solid electrolyte is ground uniformly and dispersed in a mold, and then cold pressed, for example at 50 MPa, to obtain the solid electrolyte sheet.

In a fourth aspect of the present application, an embodiment of the present application also provides an all-solid-state lithium ion battery prepared by the solid electrolyte or solid electrolyte sheet of the embodiment of the present application, the all-solid-state lithium ion battery may be an all-solid-state lithium ion battery in various form.

In a fifth aspect of the present application, the present application provides a stacked all-solid-state lithium ion battery, including a positive electrode sheet, a solid electrolyte sheet and an negative electrode sheet; where the solid electrolyte sheet is the solid electrolyte sheet of the embodiment of the present application.

According to some embodiments of the present application, the positive electrode sheet is prepared by a raw materials including the solid electrolyte, a positive active material and conductive agent; where the solid electrolyte is the solid electrolyte of the embodiment of the present application.

According to some embodiments of the present application, the preparation method for the stacked all-solid-state lithium ion battery includes the following steps:

S1. preparing the positive electrode sheet;
S2. preparing the solid electrolyte sheet according to an embodiment of the present application;
S3. preparing the negative electrode sheet;
S4. stacking the positive electrode sheet, solid electrolyte sheet and negative electrode sheet successively, and pressing with pressure to obtain the all-solid-state lithium ion battery.

According to a preferred embodiment of the present application, the step S1 includes:
preparing the sulphide solid electrolyte according to the preparation method in the first aspect of the present application;
mixing the solid electrolyte with positive active materials and conductive agent, and grinding to obtain a positive powder material;

dispersing the positive powder material on the surface of aluminum foil of positive current collector, performing cold press to obtain the positive electrode sheet.

The positive electrode sheet, solid electrolyte sheet, and negative electrode sheet are respectively sliced according to the required dimensions, and the sliced positive electrode sheet, solid electrolyte sheet, and negative electrode sheet are aligned in the center and sequentially stacked to form a sandwich layer unit, and the sandwich layer unit is pressurized to compound together at a certain temperature to acquire a cell of the all-solid-state lithium ion battery; the cell is encapsulated and placed in the outer package after cold pressing to obtain the all-solid-state lithium ion battery, which includes a positive electrode sheet and a negative electrode sheet and a solid electrolyte sheet spaced between the positive electrode sheet and the negative electrode sheet.

In the sixth aspect of the present, an embodiment of the present application also provides a device, including the all-solid-state lithium ion battery in the fourth aspect of the present application or the stacked all-solid-state lithium ion battery in the fifth aspect of the present application.

According to a preferred embodiment of the present application, the all-solid-state lithium ion battery or stacked all-solid-state lithium ion battery may be used either as a power source or an energy storage unit for the device. The device of the present application employs the all-solid-state lithium ion battery or stacked all-solid-state lithium ion battery provided by the present application, and therefore has at least the same advantage as the all-solid-state lithium ion battery or stacked all-solid-state lithium ion battery.

The device may be, but not limited to, mobile devices (e.g., cellphones, laptops, etc.), electric vehicles (e.g., pure electric vehicles, hybrid electric vehicles, plug-in hybrid electric vehicles, electric bikes, electric scooters, electric golf carts, electric trucks, etc.), electric trains, ships, satellites and energy storage systems and so on.

Figure 5:
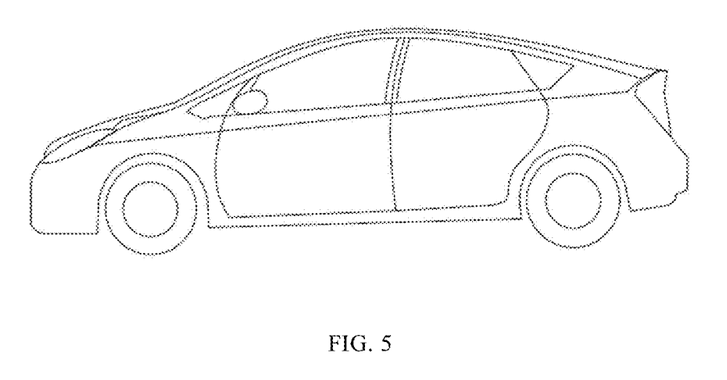
FIG. 5 is a schematic diagram of a device according to an embodiment of the present application.

FIG. 5 is an example of a device. The device may be a pure electric vehicle, a hybrid electric vehicle, or a plug-in hybrid electric vehicle and so on. In order to meet the requirements of the device for the high power and high energy density of the battery, a battery package or battery module may be used.

According to a specific embodiment of the present application, the device may be a cellphone, a tablet, a laptop and so on. The device generally requires lightness and thinness, and the battery of the embodiment of the present application can be used as a power source.

The present application is further described below in connection with the specific examples. It is to be understood that the examples are intended only to illustrate the present application and are not intended to limit the scope of the present application.

The preparation of the solid electrolyte

According to Table 1, mixing the Li precursor (it should be noted that the mixture of $Li_2S$ and LiCl is a mixture formed according to the amount of substance ratio of 2:1) with the central atom ligand evenly, and dispersing into pyridine to form an initial reaction mixture; dispersing the borate ester into pyridine to form a modified solution; mixing the initial reaction mixture with the modified solution to form an evenly mixing material by sufficient dispersing; performing heating and drying treatment to the evenly mixing material to remove solvent, the drying process needs to be performed in a vacuum environment with a vacuum degree of less than −90 kPa, and the drying temperature is maintained at 100° C., thus obtaining an initial product; after grinding the initial product, performing cold press molding under the pressure according to Table 1 to obtain a dense disc sample; performing heat treatment to the pressed dense initial product, thus obtaining the solid electrolyte of examples 1 to 24 and the comparative examples 1 to 2, the temperature and time for the heat treatment is shown in Table 1, the atmosphere of heat treatment is argon atmosphere.

Preparing all-Solid-State Lithium Ion Battery (1) Preparation of Positive Electrode Sheet Mixing the positive active material $LiNi_{1/3}Co_{1/3}Mn_{1/3}O_2$, the solid electrolyte prepared in the examples 1 to 24 or the comparative examples 1 to 2 and the conductive agent Super-P in a mass ratio of 70:27:3, and grinding to obtain the evenly dispersed positive powder material; dispersing the positive powder material on the surface of aluminum foil of positive current collector, performing cold press at 50 MPa to obtain the positive electrode sheet.

(2) The Preparation of the Electrolyte Sheet

Grinding evenly the solid electrolyte prepared in the examples 1 to 24 or the comparative examples 1 to 2 and dispersing into a sleeve mold, and then perform the cold press at 50 MPa to obtain the electrolyte sheet.

(3) the Preparation of the Negative Electrode Sheet of Lithium Metal

Attaching the lithium foil to a surface of a copper foil of the negative current collector through roll pressing, then slitting to obtain the negative electrode sheet.

(4) The Preparation of all-Solid-State Lithium Ion Battery

Stacking the above-mentioned positive electrode sheet, the solid electrolyte sheet and the negative electrode sheet of Lithium metal sequentially and pressurizing under 300 MPa to prepare the all-solid-state lithium ion battery.

Performing the following performance tests to the prepared solid electrolyte and all-solid-state lithium ion battery:

(1) Conductivity test: pressing the solid electrolyte under the pressure of 300 MPa to produce a disc, measuring the ohm impedance of the electrolyte disc by using Chenhua electrochemical workstation, a test temperature is 25° C., the frequency range is between 1 Hz and 1 MHz, the perturbation signal is 5 mV. Based on the ohm impedance, a thickness and an area of the electrolyte sheet, the ion conductivity may be calculated.

(2) XRD test:

Placing the sulphide electrolyte powder on a glass sample table for X-ray diffraction analysis, the range of scanning angle is 15 to 70 degree, the scanning speed is 5 degree/min.

(3) Raman test:

Placing the sulphide electrolyte powder into a sample tube for Raman test, the wavelength range is between 300 and 500 $cm^{-1}$.

(4) DSC-TG test:

Performing differential scanning thermogravimetric analysis to the borate ester power under protective atmosphere, the test range is 35 to 700° C., the rate of temperature increase is 5° C./min.

(5) Capacity test:

Preparing the solid battery, using a Blue electricity tester to measure the capacity performance, the charge-discharge rate is 0.1 C, the cut-off voltage is 2.8 to 4.2 V.

Figure 1:
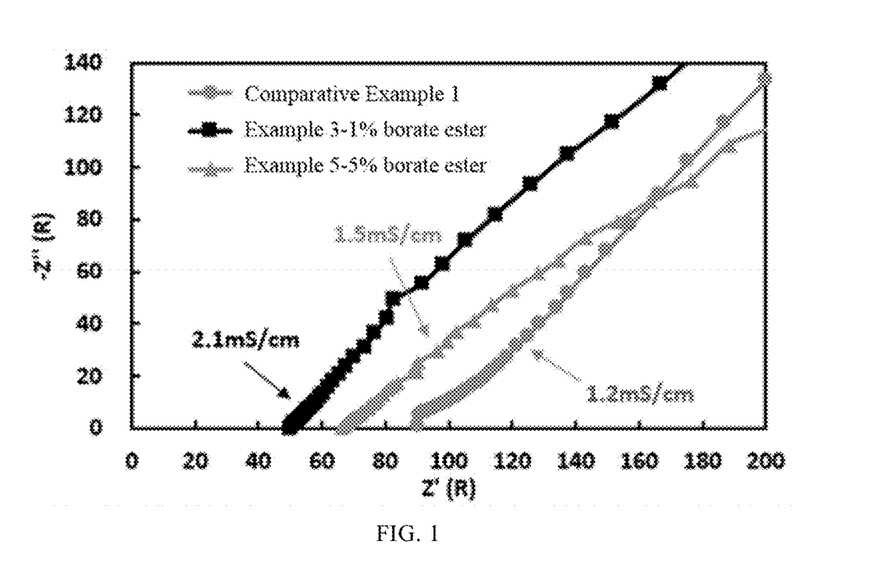
FIG. 1 is an impedance spectrum of a solid electrolyte according to an embodiment of the present application.

FIGS. 1 to 4 and Table 1 shows the specific result of the above tests:

FIG. 1 is an impedance spectrum of a solid electrolyte according to an embodiment of the present application, from which it can be seen that doping with 1% borate ester can improve the conductivity of the electrolyte.

Figure 2:
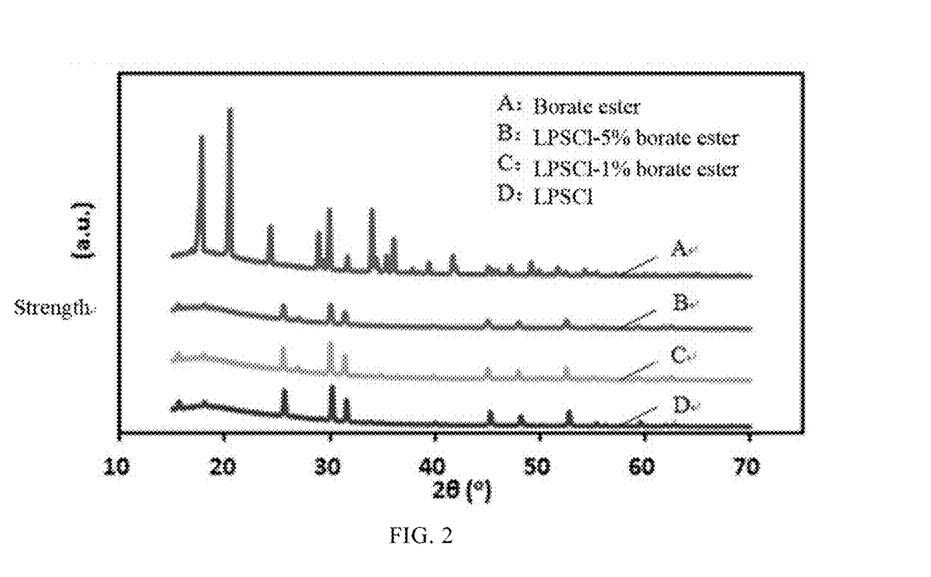
FIG. 2 is an XRD test pattern of a solid electrolyte according to an embodiment of the present application.

FIG. 2 is an XRD test pattern of a solid electrolyte according to an embodiment of the present application, from which it can be seen that main lattice diffraction peaks of the solid electrolyte after being doped with borate ester are the same as those of the control sample, which proves that the introduction of a small amount of borate ester does not affect the structure of the sulphide electrolyte; and the diffraction peaks of the borate ester itself do not appear in the doped sample, indicating that the borate ester has been completely decomposed.

Figure 3:
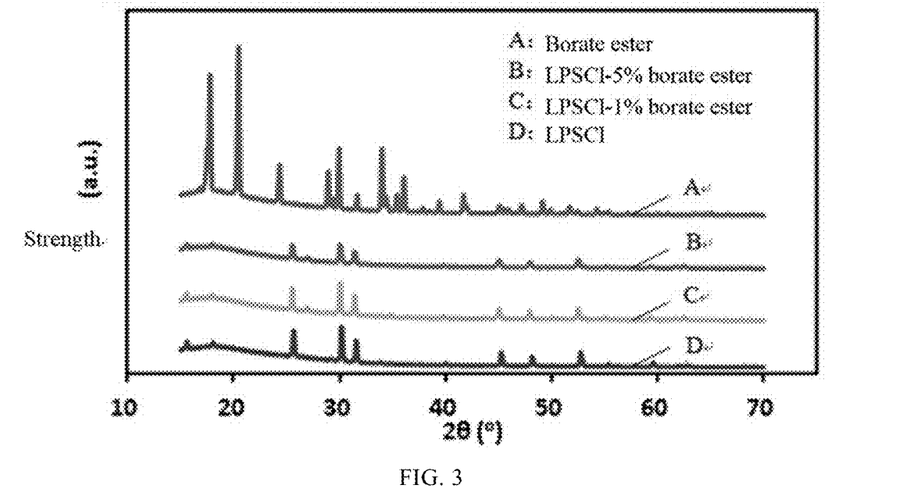
FIG. 3 is a graph of the result of the Raman test of a solid electrolyte according to an embodiment of the present application.

FIG. 3 is the result of Raman test of a solid electrolyte according to an embodiment of the present application from which it can be seen that the solid electrolyte after being doped with borate ester only shows the same peak as the control sample, which represents the $PS^{4-}$ group in the sulphide solid electrolyte, and also indicates that the main structure of the solid electrolyte has not changed before and after the doping.

Figure 4:
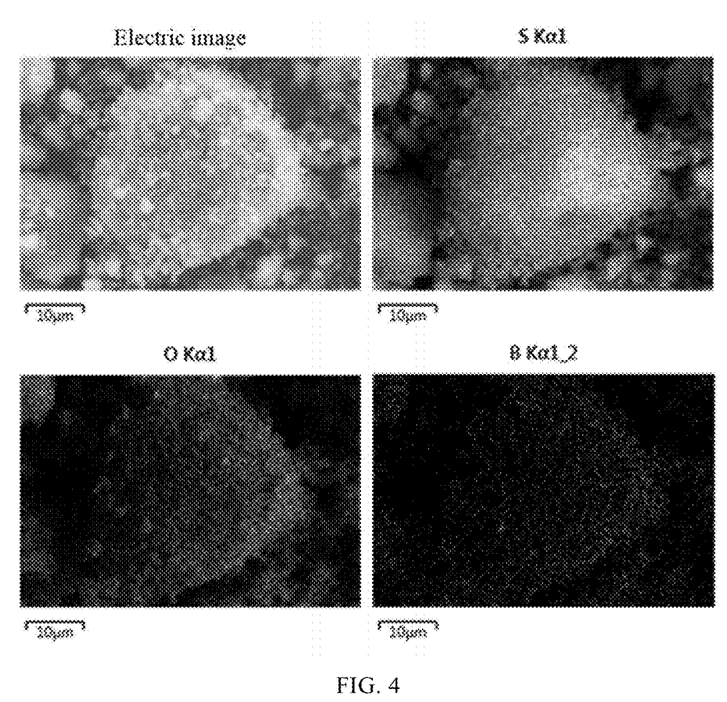
FIG. 4 a graph of the elemental distribution test result of a solid electrolyte according to an embodiment of the present application.

FIG. 4 is the elemental distribution test result of a solid electrolyte according to an embodiment of the present application, and it is clear from the figure that the distribution regions of the B and O elements and the distribution regions of the S elements basically overlap, proving that the B and O elements are uniformly doped into the sulphide electrolyte.

The Table 1 below is the specific parameters and test results of the examples 1 to 24 and the comparative examples 1 to 2:

TABLE 1

Specific parameters and test results of examples and comparative examples

| | Type of Li precursor | Content of Li precursor (mol %) | Type of central atom ligand | Content of contral atom ligand (mol %) | Type of Borate ester | Content of Borate ester(mol %) |
|---|---|---|---|---|---|---|
| Example 1 | mixture of $Li_2S$ and LiCl | 89.9 | $P_2S_5$ | 10 | 1-1 | 0.1 |
| Example 2 | mixture of $Li_2S$ and LiCl | 89.9 | $P_2S_5$ | 10 | 1-1 | 0.5 |
| Example 3 | mixture of $Li_2S$ and LiCl | 89 | $P_2S_5$ | 10 | 1-1 | 1 |
| Example 4 | mixture of $Li_2S$ and LiCl | 88 | $P_2S_5$ | 10 | 1-1 | 2 |
| Example 5 | mixture of $Li_2S$ and LiCl | 85 | $P_2S_5$ | 10 | 1-1 | 5 |
| Example 6 | mixture of $Li_2S$ and LiCl | 89 | $P_2S_5$ | 10 | 1-1 | 1 |
| Example 7 | mixture of $Li_2S$ and LiCl | 89 | $P_2S_5$ | 10 | 1-1 | 1 |
| Example 8 | mixture of $Li_2S$ and LiCl | 89 | $P_2S_5$ | 10 | 1-1 | 1 |
| Example 9 | mixture of $Li_2S$ and LiCl | 89 | $P_2S_5$ | 10 | 1-1 | 1 |
| Example 10 | mixture of $Li_2S$ and LiCl | 89 | $P_2S_5$ | 10 | 1-1 | 1 |
| Example 11 | mixture of $Li_2S$ and LiCl | 89 | $P_2S_5$ | 10 | 1-1 | 1 |
| Example 12 | mixture of $Li_2S$ and LiCl | 89 | $P_2S_5$ | 10 | 1-1 | 1 |
| Example 13 | mixture of $Li_2S$ and LiCl | 89 | $P_2S_5$ | 10 | 1-1 | 1 |
| Example 14 | mixture of $Li_2S$ and LiCl | 89 | $P_2S_5$ | 10 | 1-1 | 1 |

TABLE 1-continued

Specific parameters and test results of examples and comparative examples

| | | | | | |
|---|---|---|---|---|---|
| Example 15 | mixture of $Li_2S$ and LiCl | 89 | $P_2S_5$ | 10 | 1-1 | 1 |
| Example 16 | mixture of $Li_2S$ and LiCl | 89 | $P_2S_5$ | 10 | 1-1 | 1 |
| Example 17 | mixture of $Li_2S$ and LiCl | 89 | $P_2S_5$ | 10 | 1-1 | 1 |
| Example 18 | mixture of $Li_2S$ and LiCl | 89 | $P_2S_5$ | 10 | 1-1 | 1 |
| Example 19 | mixture of $Li_2S$ and LiCl | 89 | $P_2S_5$ | 10 | 1-1 | 1 |
| Example 20 | mixture of $Li_2S$ and LiCl | 89 | $P_2S_5$ | 10 | 1-1 | 1 |
| Example 21 | mixture of $Li_2S$ and LiCl | 89 | $P_2S_5$ | 10 | 1-1 | 1 |
| Example 22 | mixture of $Li_2S$ and LiCl | 89 | $P_2S_5$ | 10 | 1-1 | 1 |
| Example 23 | mixture of $Li_2S$ and LiCl | 89 | $P_2S_5$ | 10 | 1-2 | 1 |
| Example 24 | mixture of $Li_2S$ and LiCl | 89 | $P_2S_5$ | 10 | 1-3 | 1 |
| Comparative Example 1 | mixture of $Li_2S$ and LiCl | 90 | $P_2S_5$ | 10 | / | / |
| Comparative Example 2 | $Li_2S$ | 90 | $P_2S_5$ | 10 | / | / |

| | Dispersion time(h) | Cold press presure (Mpa) | Heat treatment temperature (° C.) | Heat treatment time (h) | Conductivity of the solid electrolyte (mS/cm) | Capacity of solid battery (mAh/g) |
|---|---|---|---|---|---|---|
| Example 1 | 10 | 100 | 550 | 1.5 | 1.4 | 144 |
| Example 2 | 10 | 100 | 550 | 1.5 | 1.9 | 152 |
| Example 3 | 10 | 100 | 550 | 1.5 | 2.1 | 160 |
| Example 4 | 10 | 100 | 550 | 1.5 | 2 | 158 |
| Example 5 | 10 | 100 | 550 | 1.5 | 1.5 | 146 |
| Example 6 | 5 | 10 | 550 | 1.5 | 1.7 | 149 |
| Example 7 | 12 | 100 | 550 | 1.5 | 2.1 | 160 |
| Example 8 | 15 | 100 | 550 | 1.5 | 2.1 | 158 |
| Example 9 | 20 | 100 | 550 | 1.5 | 2 | 156 |
| Example 10 | 12 | 50 | 550 | 1.5 | 1.7 | 150 |
| Example 11 | 12 | 80 | 550 | 1.5 | 2.1 | 159 |
| Example 12 | 12 | 120 | 550 | 1.5 | 2.1 | 161 |
| Example 13 | 12 | 200 | 550 | 1.5 | 1.8 | 152 |
| Example 14 | 12 | 120 | 550 | 1.5 | 1.6 | 144 |
| Example 15 | 12 | 120 | 550 | 1.5 | 1.8 | 155 |
| Example 16 | 12 | 120 | 550 | 1.5 | 2 | 158 |
| Example 17 | 12 | 120 | 550 | 1.5 | 1.5 | 141 |
| Example 18 | 12 | 120 | 550 | 0.5 | 1.4 | 140 |
| Example 19 | 12 | 120 | 550 | 1 | 2 | 159 |
| Example 20 | 12 | 120 | 550 | 2 | 1.9 | 155 |
| Example 21 | 12 | 120 | 550 | 5 | 1.7 | 148 |
| Example 22 | 12 | 120 | 550 | 2 | 1.4 | 142 |
| Example 23 | 12 | 120 | 550 | 2 | 2.1 | 158 |
| Example 24 | 12 | 120 | 550 | 2 | 2 | 159 |
| Comparative Example 1 | 12 | 100 | 550 | 1.5 | 1.2 | 137 |
| Comparative Example 2 | 12 | 120 | 550 | 2 | 0.9 | 144 |

(in Table 1, the content of lithium precursor means: the percentage of amount of substance of lithium precursor accounts for the total amount of substance of lithium precursor, central atom ligand and borate ester; the content of central atom ligand means: the percentage of amount of substance of central atom ligand accounts for the total amount of substance of lithium precursor, central atom ligand and borate ester; the content of central borate ester means: the percentage of amount of substance of borate ester accounts for the total amount of substance of lithium precursor, central atom ligand and borate ester.)

The data shown in Table 1 shows the effect of each parameter in the present application embodiment on the performance of the prepared solid electrolyte and lithium ion batteries.

The data of examples 1 to 5 and comparative example 1 show the effect of the added amount of borate ester on the performance of solid electrolyte and battery. Doping modification of the sulphide solid electrolyte by adding borate ester in appropriate amounts (e.g., examples 2, 3, and 4) can effectively improve the ionic conductivity of the solid electrolyte and the delivery of the cell capacity. However, when the addition of borate ester is too low (shown in example 1), the conductivity of the solid electrolyte is increased, but the increase is small; and when the addition of borate ester is too high (shown in example 5), the lithium ion concentration in the raw material decreases and the crystal structure of the electrolyte may also be affected, resulting in no further improvement in conductivity. Thus, taking into account both cost and performance factors, in an embodiment of the present application, the addition of borate ester is within the following range: the amount of substance of the borate ester accounts for 0.1% to 5% of the total amount of substance of the lithium precursor, central atom ligand and borate ester, preferably, the amount of substance of the borate ester accounts for 0.5% to 2% of the total amount of substance of the lithium precursor, central atom ligand and borate ester.

Example 3 and examples 6 to 9 indicate that, during the process of dispersing borate ester into organic solvent to form the modified solution, the dispersion time of borate ester may influence the performance of the prepared solid electrolyte and battery. Specifically, the dispersion time of borate ester may influence the mixing effect of the initial reaction mixture and modified solution. When the dispersion time is too short (shown in example 6), although the conductivity of solid electrolyte may be improved to some extent, the improvement of the conductivity of the produced solid electrolyte and the battery performance is not obvious due to insufficient contact between borate ester and reaction material (lithium precursor and central atom ligand); when the dispersion time is too long (shown in example 9), although the conductivity of produced solid electrolyte may be improved, while the production efficiency may be decreased. Therefore, in an embodiment of the present application, the dispersion time of the modified solution is 5 to 20 hours, preferably, the dispersion time of modified solution is 10 to 20 hours.

Example 7 and examples 10 to 13 indicate that, during the steps of obtaining solid electrolyte by performing grinding, cold press and heat treatment to the initial product, the cold press pressure for the initial product may influence the performance of the prepared solid electrolyte and battery. Specifically, the cold press pressure may influence the diffusion process between elements during high temperature treatment. When the pressure is too small (shown in example 10), the looseness of the block causes poor contact between the reaction materials, which affects the formation of phase structure and the increase of conductivity, although it is improved compared to the conductivity in the comparative example, the magnitude of the improvement is not large; when the pressure is too big (shown in example 13), the block is prone to severe cracking and is not conducive to product formation, although the conductivity has been increased compared to the comparative example, it fails to achieve the performance improvement effect of example 12. Therefore, in an embodiment of the present application, the cold press is the cold press molding under the cold press pressure of 50 to 200 MPa; preferably, the cold press is the cold press molding under the cold press pressure of 80 to 120 MPa.

Example 12 and examples 14 to 17 indicate that, during the step of performing heat treatment to obtain solid electrolyte, the heat treatment temperature may influence the performance of the prepared solid electrolyte and battery. Specifically, the heat treatment temperature should match the phase formation temperature of sulphide and the decomposition temperature of borate ester. When the heat treatment temperature is too low (like example 14), the specific electrolyte crystal phase may not be obtained and the borate ester cannot be completely decomposed, so the electrolyte conductivity is increased, but the increase in conductivity is small due to the extremely low amount of effective B doping; when the heat treatment temperature is too high (like example 17), the sulphide electrolyte itself is prone to undergo phase change, resulting in the formation of a impurity phase, the increase of conductivity and the delivery of capacity may also be reduced. Therefore, in an embodiment of the present application, the temperature range of the heat treatment is between 400 and 700° C.; preferably, the temperature range of the heat treatment is between 500 and 600° C.

Example 15 and examples 18 to 21 indicate that, during the step of performing heat treatment to obtain the solid electrolyte, the time for heat treatment may influence the performance of the prepared solid electrolyte and battery. The time for heat treatment has a great influence on the formation of the phase structure of the electrolyte and the internal diffusion process of the doping elements, when the time is too short (like example 18), there may be residual reactants and uneven distribution of the doping elements, making it difficult to improve the electrolyte conductivity and battery capacity to the best; when the time for heat treatment is too long (like example 21), it may cause the generation of impurity and also affect the battery performance to the best. Therefore, in an embodiment of the present application, the time for heat treatment is 0.5 to 5 hours; preferably, the time for heat treatment is 1 to 2 hours.

It can be seen from examples 20 and 22, and comparative example 2 that the conductivity of modified solid electrolyte after being doped with borate ester and the battery capacity is still improved significantly with the replacement of the composition of lithium precursor in the raw material, indicating that the beneficial effect of the present application are not limited by the composition of the lithium precursor. In addition, an appropriate adjustment to the composition structure of borate ester (like examples 23 and 24) may also obtain the similar modified effect. This is mainly because the decomposition temperature and decomposition products of borate ester do not change much after the structural change of the borate ester, thus the doping modification process of the sulphide electrolyte does not have substantial change, the borate ester modification may still effectively improve the ionic conductivity of the solid electrolyte, which contributes to the capacity performance of the battery.

According to the disclosure and teaching of the above specification, those skilled in the art may also change and modify the above embodiments. Therefore, the present application is not limited to the specific embodiments disclosed and described above, and some modifications and changes to this application should also fall within the protection scope of the claims of the present application. In addition, although some specific terms are used in this specification, these terms are only for convenience of description and do not constitute any limitation to the application.

The invention claimed is:

1. A preparation method for a solid electrolyte, comprising:

acquiring an initial reaction mixture comprising a lithium precursor, a central atom ligand and an organic solvent;

acquiring a modified solution comprising a borate ester and the organic solvent;

mixing the initial reaction mixture and the modified solution, and drying to obtain an initial product; and performing a post-treatment to the initial product to obtain the solid electrolyte.

2. The preparation method for a solid electrolyte according to claim 1, wherein the lithium precursor comprises one or more of $Li_2S$ and LiX, wherein X comprises one or more of F, Cl, Br and I.

3. The preparation method for a solid electrolyte according to claim 1, wherein the central atom ligand comprises one or more of $P_2S_5$, $SiS_2$, $GeS_2$, $B_2S_3$ and $Al_2S_3$.

4. The preparation method for a solid electrolyte according to claim 1, wherein the borate ester has a structure shown in formula (I):

wherein R is selected from C1~C4 alkyl.

5. The preparation method for a solid electrolyte according to claim 4, wherein the borate ester is selected from one or more of structures (I-1) to (I-4):

6. The preparation method for a solid electrolyte according to claim 1, wherein an amount of substance of the lithium precursor accounts for 70~94% of a total amount of substance of the lithium precursor, central atom ligand and borate ester.

7. The preparation method for a solid electrolyte according to claim 1, wherein an amount of substance of the central atom ligand accounts for 5~25% of the total amount of substance of the lithium precursor, central atom ligand and borate ester.

8. The preparation method for a solid electrolyte according to claim 1, wherein an amount of substance of the borate ester accounts for 0.1~5% of the total amount of substance of the lithium precursor, central atom ligand and borate ester.

9. The preparation method for a solid electrolyte according to claim 1, wherein, after mixing the initial reaction mixture and the modified solution, a sufficient dispersing is performed, and a time for the sufficient dispersing is 5~20 hours.

10. The preparation method for a solid electrolyte according to claim 1, wherein the cold press is a cold press molding under a cold press pressure of 50 to 200 MPa.

11. The preparation method for a solid electrolyte according to claim 1, wherein a temperature range of the heat treatment is 400~700° C.

12. The preparation method for a solid electrolyte according to claim 1, wherein a time for the heat treatment is 0.5 to 5 hours.

13. A solid electrolyte obtained by the preparation method for a solid electrolyte according to claim 1.

14. The solid electrolyte according to claim 13, wherein a conductivity of the solid electrolyte is above 1.4 mS/cm.

15. The solid electrolyte according to claim 13, wherein a battery capacity of the solid electrolyte is above 140 mAh/g.

16. A solid electrolyte sheet, the solid electrolyte sheet is prepared by the solid electrolyte prepared by the preparation method according to claim 1.

17. An all-solid-state lithium ion battery, wherein the all-solid-state lithium ion battery is prepared by the solid electrolyte prepared by the preparation method according to claim 1.

18. A stacked all-solid-state lithium ion battery, comprising:
   a positive electrode sheet, a solid electrolyte sheet and a negative electrode sheet; wherein, the solid electrolyte sheet is the solid electrolyte sheet according to claim 16.

19. A device, comprising:
   the all-solid-state lithium ion battery according to claim 17.

* * * * *